Nov. 3, 1925.

R. R. MILLER 1,559,973

TRACKLAYING TREAD DRIVE WHEEL

Filed Feb. 11, 1921   3 Sheets-Sheet 1

Nov. 3, 1925.
R. R. MILLER
1,559,973
TRACKLAYING TREAD DRIVE WHEEL
Filed Feb. 11, 1921   3 Sheets-Sheet 2
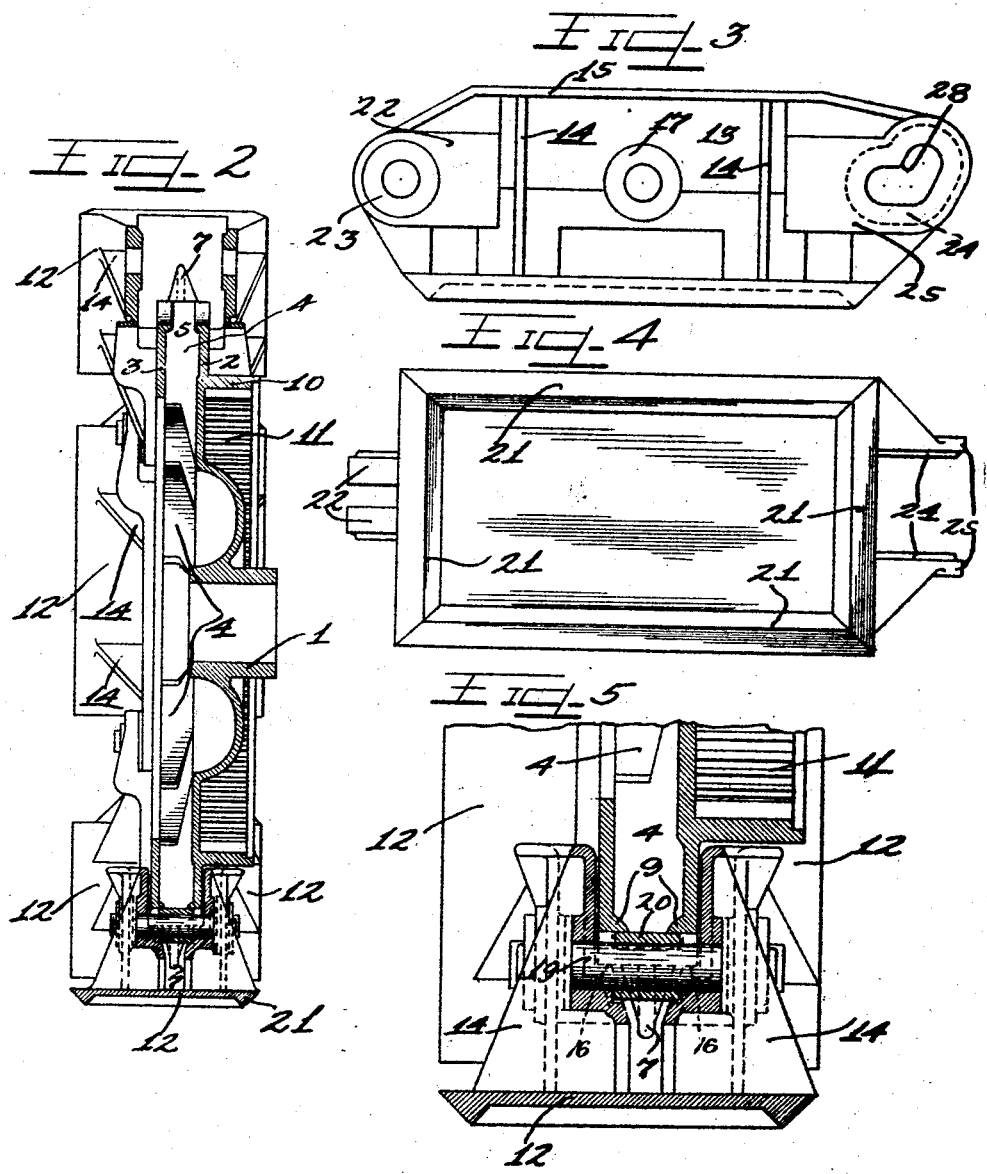

Nov. 3, 1925.  
R. R. MILLER  
TRACKLAYING TREAD DRIVE WHEEL  
Filed Feb. 11, 1921  
1,559,973  
3 Sheets-Sheet 3
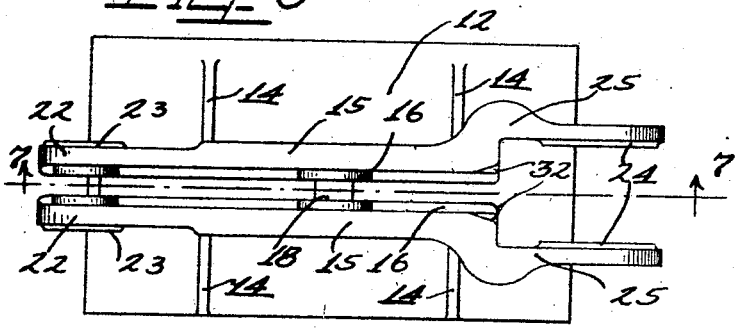
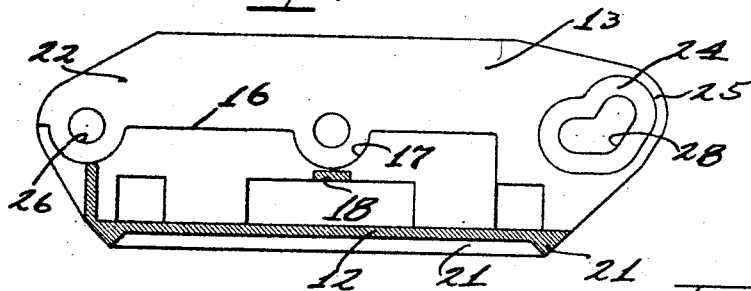
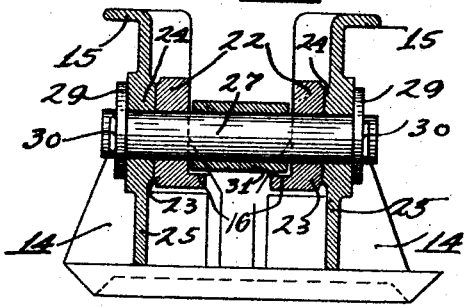
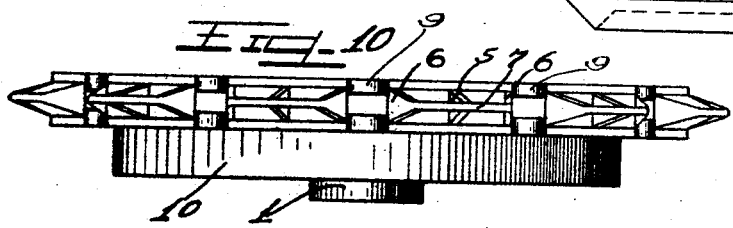
WITNESSES  
INVENTOR  
ROYAL R. MILLER Patented Nov. 3, 1925.

1,559,973

UNITED STATES PATENT OFFICE.

ROYAL R. MILLER, OF CHICAGO, ILLINOIS, ASSIGNOR TO MILLER TRACTION TREAD COMPANY, A CORPORATION OF DELAWARE.

TRACKLAYING TREAD DRIVE WHEEL.

Application filed February 11, 1921. Serial No. 444,115.

*To all whom it may concern:*

Be it known that I, ROYAL R. MILLER, a citizen of the United States, and a resident of the city of Chicago, in the county of Cook and State of Illinois, have invented certain new and useful Improvements in a Tracklaying Tread Drive Wheel; and I do hereby declare that the following is a full, clear, and exact description of the same, reference being had to the accompanying drawings, and to the numerals of reference marked thereon, which form a part of this specification.

This invention relates to a track laying tread drive wheel and embodies improvements in the drive wheel disclosed in my Patent No. 1,373,905, April 5, 1921. In drive wheels of this type, tread elements are carried by a single wheel and driven by gear teeth on said wheel and it is necessary, in order to effect an efficient drive, to provide a properly designed lost motion connection between the tread members. It is, of course, also desirable that the driving and supporting wheel be made strong and light in weight and that the gear teeth thereon be properly shaped and reinforced to assure a smooth and positive driving action.

It is an object therefore of the present invention to provide a track laying tread type of drive wheel wherein tread elements are connected by means engaged through apertures in certain thereof and through irregular slots in the tread elements adjacent thereto.

It is also an object of this invention to provide a gear driven track laying tread drive wheel wherein the driving gear teeth are composed of end portions and an integral longitudinal reinforcing rib of less width than said end portions.

It is a further object of this invention to provide a gear driven track laying tread type drive wheel wherein the tread elements are supported and driven from points on the driving gear which are substantially coincident with the pitch line thereof.

It is an important object of this invention to provide a track laying tread drive wheel wherein connecting slots of irregular shape allow a sufficient relative movement of the tread members to maintain the same in a true rolling relation with the driving gear wheels.

It is finally an important object of this invention to provide a track laying tread drive wheel wherein adjacent tread elements are provided with connecting means which allow a predetermined relative movement of adjacent tread elements in angularly positioned guideways.

Other and further important objects of this invention will be apparent from the disclosures in the specification and the accompanying drawings.

The invention (in a preferred form) is shown on the drawings and hereinafter more fully described.

On the drawings:

Figure 2 is a section on the line 2—2 of Figure 1.

Figure 3 is a side elevation of one of the tread elements.

Figure 4 is a bottom plan view of one of the tread elements.

Figure 5 is an enlarged sectional detail showing the connection between the tread elements and the driving gear.

Figure 6 is a plan view of the inner side of one of the tread elements.

Figure 7 is a section on the line 7—7 of Figure 6.

Figure 8 is an enlarged fragmentary section on the line 8—8 of Figure 1.

Figure 9 is an enlarged section on the line 9—9 of Figure 1.

Figure 10 is a plan view of the driving gear wheel.

As shown on the drawings:

Figure 1:
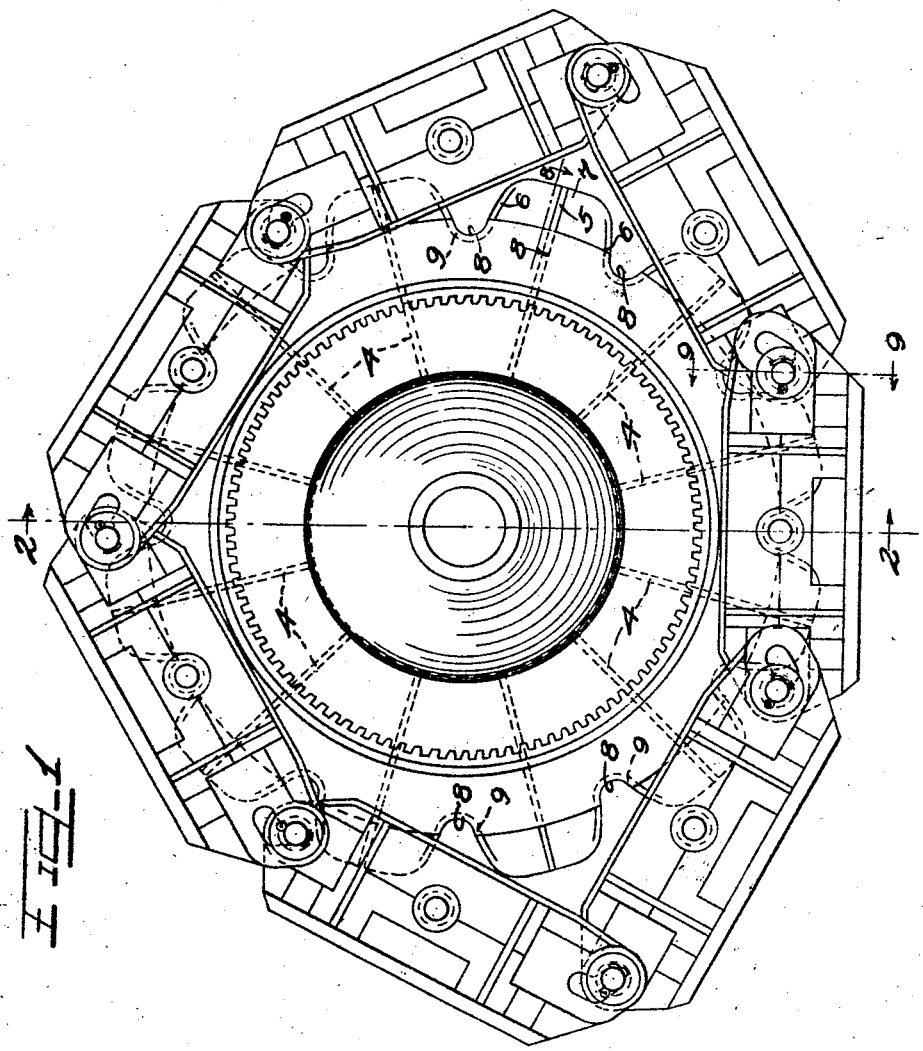
Figure 1 is a side elevation of a track laying tread drive wheel embodying the principles of this invention.

Driving means for the tread element of the drive wheel of this invention are secured to hub 1 afforded by driving gear wheels which are pivotally mounted on the vehicle to be driven. Supported on each of said hubs 1 is an annular plate 2 and spaced from said annular plate 2 is an annular plate 3 which is connected to the plate 2 by a plurality of equally spaced integral ribs 4. The outer ends 5 of said ribs 4 extend beyond the periphery of the annular plates 2 and 3 and said outwardly extending portions 5 are tapered inwardly to form the central supporting portion of gear teeth which will now be described. Said gear teeth comprise converging end plates 6 which are integral with the plates 2 and 3 and which are connected by an integral longitudinal rib 7 which is also integral with the portion 5 and which is located in a plane intermediate the plates 2 and 3 parallel to the plane of said plates. The above described gear tooth structure is best shown in Figure 10 and as shown in Figure 10 the upper edges of the ribs 7 extend above the portion 5 and the end portion 6, and are properly rounded to afford easy engagement of the tread members which will be described hereinafter. In the present embodiment of this invention, the sprocket gear comprising the plates 2 and 3 with the intermediate sprocket teeth is cast as an integral structure, but it is obvious that it could be made in other ways. The outer peripheries of the annular plates 2 and 3 afford side rims or rails for additionally supporting the tread.

As clearly shown in Figure 1 the plates 2 and 3 are cut away or serially indented at 8 to provide the proper depression between the gear teeth so that means engaged therebetween will be driven from points substantially coincident with the pitch line and reinforcement of the plates 2 and 3 at said cut-away portions 8 is afforded by means of integral ribs 9 on the inside of said plates. In order that the gear wheel may be driven from a source of power on the vehicle on which it is mounted the plate 2 is provided with an inwardly extending horizontal flange 10 in which internal gear teeth 11 are formed and said gear teeth 11 are adapted to be engaged by a suitable driving pinion driven from the source of power on the vehicle. The tread elements of the track laying tread mechanism will now be described. Said tread elements comprise plates 12 which are adapted to engage the surface over which the vehicle is traveling and integrally formed on said plates 12 are spaced upright plates 13 which are braced by transverse integral ribs 14 as clearly shown in Figures 3 and 6. Outwardly extending flanges 15 are formed on the outer edges of said plates 13 and said plates are spaced sufficiently far apart to allow the plates 2 and 3 of the driving gear wheel to be engaged therebetween. Longitudinal shoulders 16 are formed on the inner sides of each of said plates 13 and said shoulders are adapted to engage the peripheries of the plates 2 and 3 but are spaced sufficiently far apart to allow the gear teeth supported on said plates to move freely therebetween. Formed on the central portion of each of said plates 13 is a boss 17 and connecting said plates directly beneath said bosses 17 is a transverse member 18 which is clearly shown in Figure 7. Extending transversely between the plates 13 and having its end supported in the apertures in the bosses 17 is a pin 19 on which is mounted a roller 20 which is rotatable on said pin between the plates 13 and which is adapted to be engaged between the gear teeth as the driving gear wheel rotates to advance the tread members. In order to afford better engagement with the surface contacted by the tread members the outsides of the plates 12 are preferably provided with ribs 21 around the edges thereof as clearly shown in Figures 4 and 7.

Means are provided for connecting the tread elements of tread members together in such a manner that they will be efficiently driven from the gear wheel and so that the shoulders 16 thereon will be maintained in a true rolling relation with the peripheries of the annular plates 2 and 3. Oppositely positioned extensions 22 are formed on one end of each of said plates 13 and facings 23 on said extensions are adapted to be engaged between facings 24 which are formed on the inner side of extensions 25 on the opposite end of the plates 13 of an adjacent tread member. A central aperture 26 is formed in each of the extensions 22 and the facings 23 thereon and engaged through said apertures 26 is a pin 27 which is also engaged through irregular or cam shaped slots 28 in the extensions 25 of an adjacent tread member. The outer ends of said pin 27 are movable in said cam shaped slots 28 and due to the peculiar form of said slots a proper relative movement of the tread members is permitted to allow the same to be maintained in the proper relation to the driving gear teeth and to the peripheries of the annular plates 2 and 3.

As will be noted from an examination of Figure 3 said slots 28 afford an angular guideway and in the embodiments of my invention shown and described herein it has been found preferable to have an angle of substantially 120° between the two branches of the angular path. The pins 27 have rollers 31 similar to the rollers 20 rotatably mounted thereon between the extensions 22 and are ordinarily secured in position in the apertures 26 and the slots 28 by means of washers 29 and cotter pins 30 as clearly shown in Figure 9. In order to facilitate the entrance of the plates 2 and 3 between said members 13 the upper edges of said members are ordinarily rounded as shown at 32 in Figure 6.

The operation is as follows:

The track laying tread elements or tread members are engaged over the gear teeth on the driving gear wheel and the adjacent ends of the same are connected together by means of the pins 27 as has been heretofore described. Upon rotation of the driving gear wheel the rollers 31 on said pin 27 and the roller 20 on the pin 19 are successively engaged in the cut-away portions 8 between the gear teeth while the shoulders or flanges 16 on the inner sides of the members 13 are advanced forwardly on the peripheries of the annular plates 2 and 3. Since the peripheries of said annular plates are substantially coincident with the pitch line of the driving gear wheel and since the drive through the connecting pins 27 and 19 is also transmitted directly from the pitch line of the driving gear wheels it is apparent that an efficient transmittal of power through the tread members is effected. On account of the peculiar form of the slots 28 a proper relative movement is maintained between the tread members to assure a true rolling relation between the driving gear teeth, the peripheries of the plates 2 and 3 and the shoulder 16 on the tread members.

By the use of the track laying tread drive wheels of this invention it is possible to attain a high tractive efficiency since the tread elements thereof move successively into flat engagement over the surface which the vehicle is traveling, and there is little likelihood of slipping, and due to the larger tread surface contacting said surface the danger of the drive wheels sinking in muddy or soft ground is lessened. This effect is due to a lessening in the amount of surface pressure per unit of area contacted, and by the use of my improved mechanism it is possible to drive the vehicle equipped therewith over surfaces which would be impassable to the ordinary type of round drive wheel.

On account of the improved reinforced construction of the driving gear wheel, a maximum of strength is attained with a great saving in the amount of material used.

I am aware that numerous details of construction may be varied through a wide range without departing from the principles of this invention, and I therefore do not purpose limiting the patent granted otherwise than necessitated by the prior art.

I claim:

1. In a track laying tread drive, a pair of annular plates integrally united by integral ribs projecting beyond said plates, a track laying tread comprising pivotally connected members having parallel guide plates trained over said ribs, said guide plates having shoulders cooperating with said annular plates.

2. In a track laying tread drive, a sprocket gear for supporting said tread comprising an integral structure having side rails with spaced projecting ribs integrally united and projecting beyond the periphery of said side rails for forming sprocket teeth.

3. In a track laying tread, a sprocket gear for supporting said tread comprising an integral structure having serially indented side rails, and teeth projecting between said rails, in combination with a track laying tread comprising pivotally united members having lost motion connections and means for straddling said teeth and engaging said rails.

4. In a track laying tread drive, a sprocket gear having teeth and serially indented side rims in combination with a tread member fitting said sprocket gear and having means engaging said serially indented rims.

5. In a track laying tread drive, a sprocket gear having teeth and serially indented side rims of a pitch corresponding to that of said sprocket teeth, in combination with a linked tread member fitting over said sprocket and having means engaging said serially indented rims.

In testimony whereof I have hereunto subscribed my name.

ROYAL R. MILLER.